May 8, 1956  N. L. ETTEN  2,744,403
MOUNTING ARRANGEMENT FOR PIVOTAL WRINGER ROLL
Original Filed Nov. 23, 1945

Inventor:
Nicholas L. Etten
by Hill, Sherman, Meroni, Gross & Simpson
Attys

United States Patent Office 2,744,403
Patented May 8, 1956

2,744,403

MOUNTING ARRANGEMENT FOR PIVOTAL WRINGER ROLL

Nicholas L. Etten, Cedar Falls, Iowa, assignor, by mesne assignments, to Chamberlain Corporation, Waterloo, Iowa, a corporation of Iowa Original application November 23, 1945, Serial No. 630,178, now Patent No. 2,589,354, dated March 18, 1952. Divided and this application January 16, 1952, Serial No. 266,729

4 Claims. (Cl. 68—244)

This invention relates to improvements in a mounting arrangement for a pivotal wringer roll, and more particularly to a mounting arrangement permitting one of a pair of wringer rolls to pivot endwise relatively to the other roll to thereby compensate for unequal thicknesses in the load passed between the rolls, although the invention will have other uses and purposes as will be apparent to one skilled in the art.

The instant invention is, of course, highly desirable for use in connection with wringers of the type used in conjunction with washing machines for handling clothing and other articles of apparel, but it will be understood that the invention is also suitable for other purposes, wherein compression is desired between a pair of rotating rollers.

The instant application is a division of my copending application entitled Wringer, filed November 23, 1945, Serial No. 630,178, now Patent No. 2,589,354, granted March 18, 1952.

It has been found desirable in many instances and especially with wringers of the type used in connection with washing machines to have one of the rolls tiltable relatively to the other to compensate for uneven loads passed between the rolls. Endeavors have been made in the past to accomplish this desideratum, but in many cases have embodied objectionably complicated apparatus as well as objectionably costly apparatus.

It is accordingly an object of the instant invention to provide a simple and economical mounting arrangement for a wringer roll permitting that roll to pivot or tilt endwise.

Also a feature of the invention is the provision of a mounting arrangement for a tiltable wringer roll, which arrangement also effects a drive connection between a shaft and the particular roll.

Another feature of the invention resides in the provision of a mounting arrangement for a tiltable wringer roll wherein a substantially universal joint type connection is established between a drive shaft and the inside of the wringer roll in question.

It is a further object of the invention to provide a mounting arrangement for a tiltable wringer roll, wherein the roll is provided with a hollow core with a shaft freely extending through that core, and there being substantially a universal connection between the core and shaft inside the roll.

While some of the more salient features, characteristics and advantages of the instant invention have been above pointed out, others will become apparent from the following disclosures, taken in conjunction with the accompanying drawing, in which—

Figure 1:
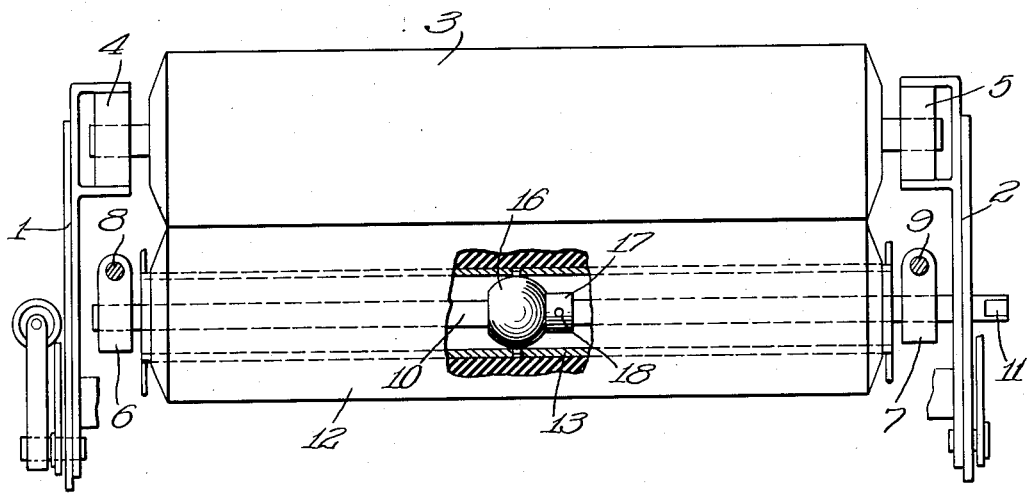
Figure 1 is a fragmentary elevational view of a wringer assembly including a mounting arrangement for a tiltable roll embodying principles of the instant invention, with parts broken away and parts shown in section.
Figure 2:
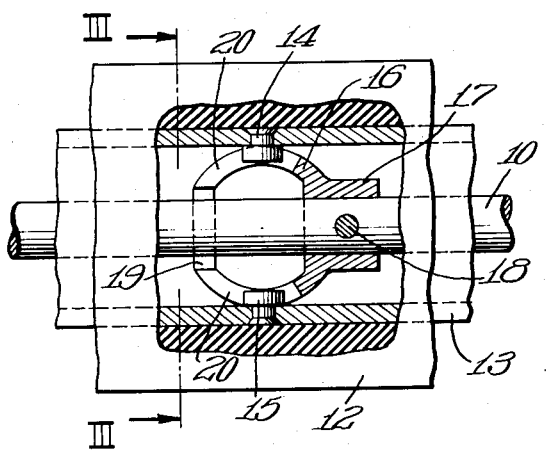
Figure 2 is an enlarged fragmentary part elevational, part vertical sectional view, of the structure seen in the central portion of Fig. 1.
Figure 3:
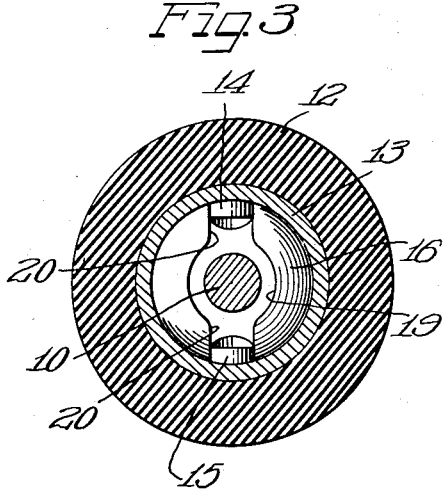
Figure 3 is an enlarged transverse vertical sectional view taken substantially as indicated by the line III—III of Fig. 2, looking in the direction of the arrows.

In Fig. 1, I have illustrated opposed bearing supports 1 and 2 for wringer roll 3, in this instance an upper roll, journaled in bearings 4 and 5 carried by the aforesaid supports. These supports may be slidable to effect pressure release between the rolls, if so desired, but since the invention is directed to the mounting of the other roll, the full details of the entire wringer need not be disclosed herein.

Mounted in suitable bearings 6 and 7, held in position in any suitable manner such as by cross pins as diagrammatically indicated at 8 and 9, is a drive shaft 10. It will be understood that while this shaft is operating, the bearings 6 and 7 are stationary, so that the shaft may rotate, but otherwise the shaft does not change its position. The outer end of the shaft is deformed as indicated at 11 for suitable connection with any form of power delivery means from which the shaft is caused to rotate.

A lower wringer roll 12, formed of any suitable yieldable material, such as rubber, is provided with a hollow core 13 therein, and this core is preferably made of metal or other sufficiently rigid material to support the rubber part of the roll under pressure. Preferably substantially centrally of the roll, inwardly projecting stud means are carried by the hollow core 13. In the illustrated instance, two such stud means are disclosed in opposed relationship at 14 and 15, these studs being substantially in the form of rivets secured in the wall of the hollow core 13, and providing enlarged heads freely extending within the hollow of that core. Insofar as the wringer roll itself is concerned those studs are all that is necessary to effect a proper driving connection for the roll and also permit the roll to tilt endwise.

In order to drive the roll and still permit it to tilt, a hollow spheroidal or ball like member 16 is secured to the shaft 10 by way of a hub portion 17 keyed to the shaft as indicated at 18. Opposite the hub portion 17 which intimately fits over the shaft, a hollow ball member is provided with an opening 19 materially larger in diameter than the shaft itself. Extending from the opening toward the hub is a pair of opposed slots 20—20 which receive the aforesaid pins 14 and 15. With such arrangement, it will be noted that the rotation of the ball like element with the pins 14 and 15 in the slots will cause similar rotation of the wringer roll, while the wringer roll may pivot endwise relatively to the shaft with the pins riding the slots lengthwise thereof.

It is a simple expedient to mount the ball like member on the shaft and then either telescope the roll over the shaft, or slip the shaft through the roll, until the pins 14 and 15 enter the slot 20 and with the shaft set in its bearings 6 and 7, the entire structure is ready for operation. The disposition of the universal connection between the shaft and the roll substantially centrally of the roll permits an even pivoting of the roll regardless of where the thicker portion of the load passing between the wringer rolls may occur. It will be understood, of course, that pressure is applied in some suitable manner to force one roll against the other, and the pivotal action of the roll 12 permits a more equalized application of that pressure on the particular load passing between the rolls.

From the foregoing it is apparent that I have provided a simple mounting arrangement, highly efficient in action, highly economical in construction, easy of assembly, and which not only permits the respective wringer roll to pivot or tilt endwise, but also establishes a positive drive connection between that roll and a shaft.

It will be understood that modifications and variations may be effected without departing from the scope of the novel concepts of the present invention.

I claim as my invention:

1. In a wringer, a frame, cooperative pressure rolls in said frame, one of said rolls being tiltable endwise, a hollow core in said one roll, a supporting shaft extending through said hollow core, a substantially spheroidal unit on said shaft, and coacting means connecting the hollow core and said unit to cause the roll and shaft to rotate together but permit the roll to tilt relatively to the shaft.

2. In a wringer, a frame, a pair of cooperative pressure rolls in said frame, one of said rolls being tiltable endwise with respect to the other roll, a hollow core in said tiltable roll, a drive shaft for said tiltable roll extending through said core, a pair of opposed studs projecting inwardly from said core, a hollow substantially spheroidal member secured to said shaft, and said member having opposed slots therein to receive said studs.

3. In a wringer, a frame, a pair of cooperative pressure rolls in said frame, one of said rolls being tiltable endwise with respect to the other roll, a hollow core in said tiltable roll, a drive shaft for said tiltable roll extending through said core, a pair of opposed studs projecting inwardly from said core, a hollow substantially spheroidal member secured to said shaft, and said member having opposed slots therein to receive said studs, said substantially spheroidal member being slightly less in diameter than the inside of said core.

4. In a wringer, a frame, a pair of cooperative pressure rolls in said frame, one of said rolls being tiltable endwise with respect to the other roll, a hollow core in said tiltable roll, a drive shaft for said tiltable roll extending through said core, a stud projecting inwardly from said core, and a hollow substantially spheroidal member having a hub-like projection to intimately receive said shaft and having an opening greater in diameter than the diameter of said shaft opposite said hub-like projection, means securing said hub-like projection to the shaft, and said member having a slot leading away from said opening to receive said stud, whereby a positive driving connection is established and the roll may tilt relatively to the shaft.

References Cited in the file of this patent

UNITED STATES PATENTS

| | | |
|---|---|---|
| 900,503 | Fetzer | Oct. 6, 1908 |
| 970,317 | Firth | Sept. 13, 1910 |
| 1,097,261 | Platt | May 19, 1914 |
| 1,189,611 | Morse | July 4, 1916 |
| 1,839,748 | Evans | Jan. 5, 1932 |
| 1,982,141 | Nault | Nov. 27, 1934 |
| 2,358,256 | Schellenberg | Sept. 12, 1944 |

FOREIGN PATENTS

| | | |
|---|---|---|
| 156,836 | Switzerland | Aug. 31, 1932 |
| 654,450 | Germany | Dec. 21, 1937 |